(12) United States Patent
Katsura et al.

(10) Patent No.: US 8,851,222 B1
(45) Date of Patent: Oct. 7, 2014

(54) MOTORCYCLE

(71) Applicant: Yamaha Hatsudoki Kabushiki Kaisha, Shizuoka-ken (JP)

(72) Inventors: Takehisa Katsura, Shizuoka-ken (JP); Toshiharu Nakajima, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 14/033,634

(22) Filed: Sep. 23, 2013

(30) Foreign Application Priority Data

Mar. 21, 2013 (JP) .................................. 2013-058531

(51) Int. Cl.
*B62K 25/28* (2006.01)
(52) U.S. Cl.
CPC ................. *B26K 25/20* (2013.01); *B26K 11/04* (2013.01)
USPC ............ 180/227; 180/219; 280/284; 280/288
(58) Field of Classification Search
CPC .............................. B26K 25/286; B26K 25/28
USPC ............................. 180/227, 219; 280/284, 288
See application file for complete search history.

(56) References Cited

U.S. PATENT DOCUMENTS

| 4,913,255 | A  | * | 4/1990 | Takayanagi et al. | 180/227 |
|---|---|---|---|---|---|
| 5,592,999 | A  | * | 1/1997 | Matsuura et al. | 180/227 |
| 6,691,814 | B2 | * | 2/2004 | Toyoda | 180/227 |
| 7,226,066 | B2 | * | 6/2007 | Ichihara et al. | 280/284 |
| 7,559,566 | B2 | * | 7/2009 | Fujita | 280/284 |
| 7,644,797 | B2 | * | 1/2010 | Kofuji | 180/227 |
| 8,186,470 | B2 | * | 5/2012 | Matayoshi | 180/227 |
| 8,474,566 | B2 | * | 7/2013 | Nimura et al. | 180/226 |

FOREIGN PATENT DOCUMENTS

JP          2007-223573 A     9/2007

* cited by examiner

*Primary Examiner* — Joseph M Rocca
*Assistant Examiner* — Marlon Arce
(74) *Attorney, Agent, or Firm* — Rabin & Berdo, P.C.

(57) ABSTRACT

A motorcycle is disclosed. The motorcycle includes a link member, a coupling rod, a first lever and a second lever. The link member is rotatably connected to a second end of a rear suspension via a first shaft, and is rotatably connected to a rear arm via a second shaft. A second end portion of the coupling rod is connected to a third shaft so as to rotate together with the third shaft. The first lever is connected to the third shaft so as to rotate together with the third shaft. The second lever is rotatably connected to the second shaft, and restricts the rotation of the first lever when engaged with the first lever. The second lever is provided with a torsion spring for providing a force for rotating the second lever around the second shaft.

12 Claims, 7 Drawing Sheets

MOTORCYCLE

TECHNICAL FIELD

The present invention relates to a motorcycle including a rear suspension.

The present application claims priority from Japanese Patent Application No. 2013-058531, filed on Mar. 21, 2013, which is incorporated by reference herein in its entirety.

BACKGROUND ART

Conventionally, a motorcycle includes a rear suspension for improving riding comfort and drivability. Japanese Laid-Open Patent Publication No. 2007-223573 discloses an off-road type motor cycle including a rear arm swingably attached to a vehicle main body and a rear suspension provided between the vehicle main body and the rear arm.

In an off-road type motorcycle called a "motocrosser", the minimum ground clearance and the length of stoke of the rear suspension are set larger than those in an on-road type motorcycle. In the off-road type motorcycle, the height of the vehicle during traveling is relatively high. Due to the relatively high vehicle height, the so-called ground-sole contact of the off-road type motorcycle may be poor. Specifically, it may be difficult for the sole of the rider to contact the ground when the rider is on the motorcycle.

Japanese Laid-Open Patent Publication No. 2007-223573 proposes a vehicle height lowering device including fixing means for fixing a rear arm at such a position that the vehicle height is lower than usual and releasing means for releasing the rear arm from the fixed state.

SUMMARY OF INVENTION

Technical Problem

However, the vehicle height lowering device disclosed in Japanese Laid-Open Patent Publication No. 2007-223573 has a problem that the rear arm cannot be released from the fixed state in a satisfactory manner.

The present invention made in light of such a situation has an object of providing a motorcycle which can be held in a state where the vehicle height is low and can be released from the state in a satisfactory manner.

Solution to Problem

A motorcycle according to the present invention includes a vehicle main body; a rear arm that supports a rear wheel; a pivot shaft that rotatably connects the rear arm to the vehicle main body, the pivot shaft extending in a vehicle width direction; a rear suspension including a first end portion rotatably supported by the vehicle main body, a second end portion, and a first spring disposed between the first end portion and the second end portion; a link member including a first shaft, a second shaft and a third shaft, the first shaft, the second shaft and the third shaft each extending in the vehicle width direction, the link member being rotatably connected to the second end portion of the rear suspension via the first shaft and rotatably connected to the rear arm via the second shaft; a coupling rod including a first end portion rotatably connected to the vehicle main body and a second end portion connected to the third shaft so as to rotate together with the third shaft; a first lever connected to the third shaft so as to rotate together with the third shaft; a second lever rotatably connected to the second shaft, the second lever restricting the rotation of the first lever when engaged with the first lever; and a second spring attached to the second lever, the second spring providing a force for rotating the second lever around the second shaft.

According to the above-described motorcycle, the coupling rod and the rear arm are coupled to each other via the link member. Therefore, when the coupling rod is rotated with respect to the vehicle main body, the rear arm is rotated around the pivot shaft. The second end portion of the coupling rod and the third shaft rotate together with each other, and the first lever and the third shaft rotate together with each other. Therefore, the coupling rod and the first lever rotate together with each other.

Accordingly, the rear arm and the first lever are associated with each other. When the rotation of the first lever is restricted, the rotation of the rear arm around the pivot shaft is restricted. The motorcycle includes the second lever for restricting the rotation of the first lever when being in engagement with the first lever. Therefore, by engaging the second lever with the first lever at such a position that the vehicle height is low, the rear arm can be fixed at such a position that the vehicle height is low. The second lever receives, from the second spring, a force for rotating the second lever around the second shaft. For this reason, once the first lever and the second lever are released from the engaged state, the second lever rotates around the second shaft. After this, the first lever and the second lever are not engaged with each other anymore. Thus, the rear arm can be released from the fixed position in a satisfactory manner.

According to an embodiment of the present invention, the first shaft is located forward of the third shaft; and the second shaft is located above the third shaft.

According to the above-described embodiment, the rear arm can be fixed and released from the fixed state in a satisfactory manner.

According to another embodiment of the present invention, the first lever includes a hole, serrated grooves being formed around the hole; and the third shaft includes an insertion portion including serrated teeth that are geared with the serrated grooves, the insertion portion being inserted into the hole.

According to the above-described embodiment, by inserting the insertion portion of the third shaft into the hole of the first lever, the first lever can be connected to the third shaft so as to rotate together with the third shaft. In addition, the attaching position of the serrated teeth with respect to the serrated grooves can be selectively changed. Therefore, the attaching position of the first lever with respect to the third shaft can be selectively changed. For this reason, by adjusting the attaching position of the first lever, the position at which the rear arm is to be fixed can be adjusted. Accordingly, the vehicle height at which the rear arm is fixed can be selectively set.

According to still another embodiment of the present invention, the motorcycle further comprises an engine including an output shaft; and a power transmission mechanism that couples the output shaft and the rear wheel to each other. The power transmission mechanism is located at either one of a position to the left of a vehicle center line and a position to the right of the vehicle center line, and the first lever and the second lever are located at the other of the position to the left of the vehicle center line and the position to the right of the vehicle center line.

According to the above-described embodiment, it is unlikely that the first lever and the second lever disturb the power transmission mechanism. The interference of the first lever and the second lever with the power transmission mechanism can be avoided easily.

According to still another embodiment of the present invention, the first lever is attached to one of a right end portion and a left end portion of the third shaft; and a rotation restriction portion that restricts the third shaft from being rotated with respect to the coupling rod when engaged with the coupling rod is provided at the other of the right end portion and the left end portion of the third shaft.

While the first lever and the second lever are in engagement with each other (namely, while the position of the rear arm is fixed), a strong force is applied to the first lever by the first spring of the rear suspension. Therefore, a strong force is applied to the third shaft. According to the above-described embodiment, the third shaft includes the rotation restriction portion. Therefore, even when receiving the strong force, the third shaft does not rotate with respect to the coupling rod. For this reason, an unintentional release of the first lever and the second lever from the engaged state while the position of the rear arm is fixed can be substantially prevented. Since the rotation restriction portion is located on the opposite side to the first lever, these elements can be located in a compact manner.

According to still another embodiment of the present invention, the motorcycle further comprises a bolt that fixes the third shaft to the coupling rod.

According to the above-described embodiment, the third shaft can be substantially prevented from being rotated with respect to the coupling rod. Therefore, an unintentional release of the first lever and the second lever from the engaged state while the position of the rear arm is fixed can be prevented with more certainty.

According to still another embodiment of the present invention, a width of the second lever narrows in a direction moving away from the second shaft.

According to the above-described embodiment, the fixing of the position of the rear arm and the release thereof from the fixed position can be performed easily.

According to still another embodiment of the present invention, a width of the first lever narrows in a direction moving away from the third shaft.

According to the above-described embodiment, the fixing of the position of the rear arm and the release thereof from the fixed position can be performed easily.

According to still another embodiment of the present invention, the third shaft is located such that when the first lever and the second lever are engaged with each other, a center of the third shaft is located rearward of a center of the first shaft and forward of a center of the second shaft.

According to the above-described embodiment, a link member for fixing the position of the rear arm and releasing the rear arm from the fixed position easily can be provided.

Advantageous Effect of Invention

According to the present invention, a motorcycle which can be held in a state where the vehicle height is low and can be released from the state in a satisfactory manner can be provided.

DESCRIPTION OF EMBODIMENTS

Figure 1:
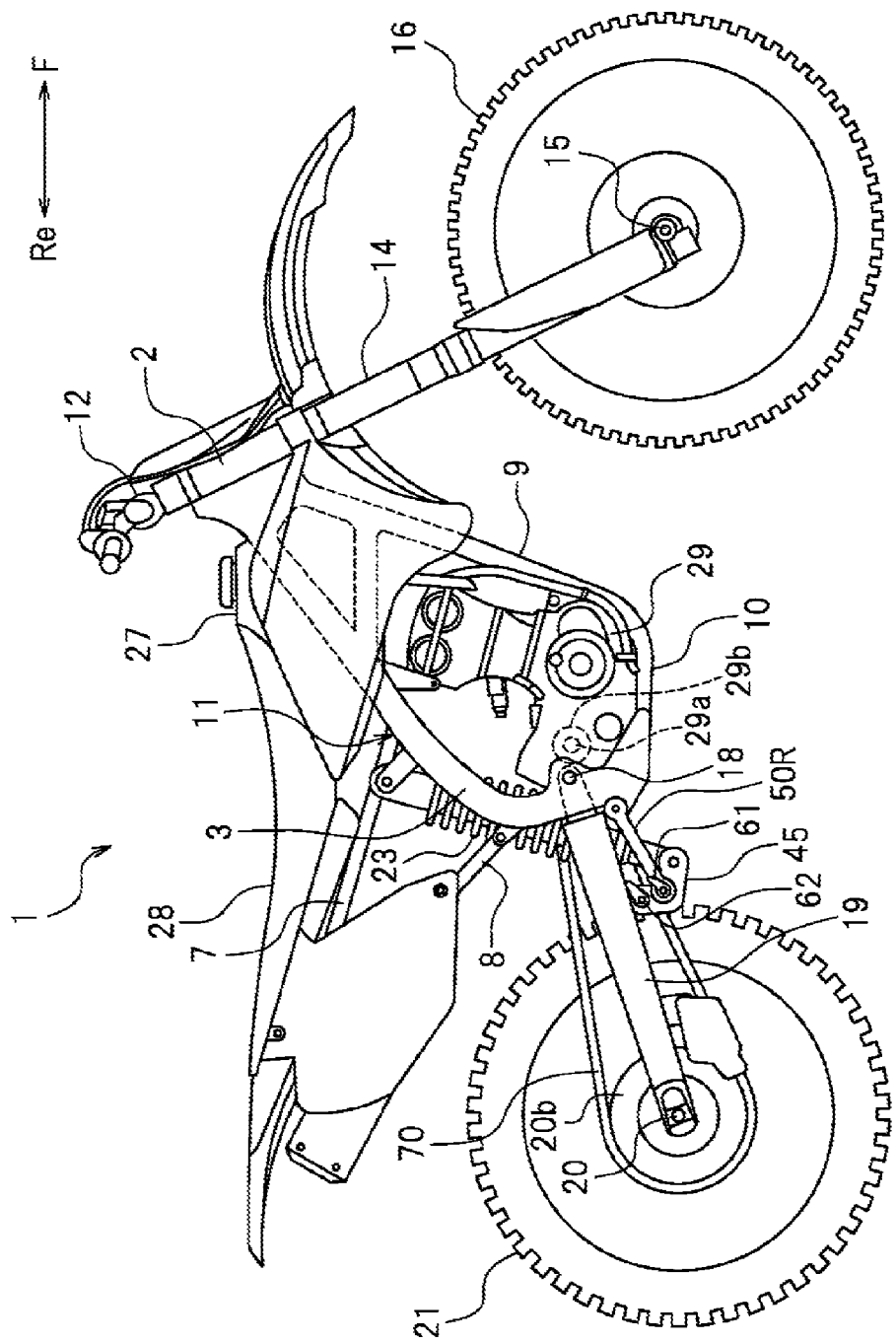
FIG. 1 is a right side view of a motorcycle in one exemplary disclosed embodiment.

Hereinafter, exemplary embodiments of the present invention will be described with reference to the drawings. As shown in FIG. 1, a motor cycle 1 in this embodiment is an off-road type motorcycle called a motocrosser. In the following description, the terms "front", "rear", "left", "right", "up" and "down" respectively mean front, rear, left, right, up and down as seen from a rider of the motorcycle 1. The terms "up" and "down" respectively correspond to the vertically upward direction and the vertically downward direction when the motorcycle 1 is stopped on a horizontal surface. In the figures, F, Re, L and R respectively indicate front, rear, left and right.

The motorcycle 1 includes a vehicle frame 11, which is a portion of a vehicle main body. Vehicle frame 11 may have any structure suitable for a vehicle main body. The vehicle frame 11 in this embodiment includes a head pipe 2, left and right main frames 3, left and right seat frames 7, left and right back stays 8, a down frame 9, and left and right bottom frames 10. The main frames 3 extend in an obliquely rearward and downward direction from the head pipe 2 as seen in a side view of the vehicle. The down frame 9 extends in an obliquely rearward and downward direction from the head pipe 2 below the main frames 3 as seen in a side view of the vehicle. The bottom frames 10 extends rearward from a bottom end of the down frame 9 as seen in a side view of the vehicle. Bottom ends of the main frames 3 and rear ends of the bottom frames 10 are coupled to each other. The seat frames 7 each extend in an obliquely rearward and upward direction from a portion of the corresponding main frame 3 as seen in a side view of the vehicle. The back stays 8 are connected to bottom portions of the main frames 3 and also to the seat frames 7. The back stays 8 are suspended between the main frames 3 and the seat frames 7.

As seen in a side view of the vehicle, a fuel tank 27 is provided above the main frames 3. The fuel tank 27 is located rearward to the head pipe 2. A seat 28 is located rearward to the fuel tank 27.

An engine 29 is fixed to the main frames 3, the down frame 9 and the bottom frames 10. The engine 29 includes an output shaft 29a, extending leftward, in a left portion thereof.

A handle 12 is rotatably inserted into the head pipe 2. A front fork 14 is connected to the handle 12. An axle 15 of a front wheel 16 is fixed to a bottom end of the front fork 14. Although not shown, the front fork 14 has a front suspension built therein.

The main frames 3 are provided with a pivot shaft 18 extending in a vehicle width direction. A front end of a rear arm 19 is swingably connected to the pivot shaft 18. The rear arm 19 is structured to be swingable around the pivot shaft 18. An axle 20 of a rear wheel 21 is rotatably connected to a rear end of the rear arm 19.

A sprocket 29b is fixed to the output shaft 29a of the engine 29. A sprocket 20b is fixed to the axle 20 of the rear wheel 21. A chain 70 is wound along the sprockets 29b and 20b. The sprockets 29b and 20b and the chain 70 are located leftward to a vehicle center line CL (see FIG. 4). The sprockets 29b and 20b and the chain 70 form an example of power transmission mechanism for transmitting the power of the engine 29 to the rear wheel 21. The power transmission mechanism is not limited to any specific mechanism, and may include, for example, a power transmission belt or a drive shaft instead of the chain.

Figure 2:
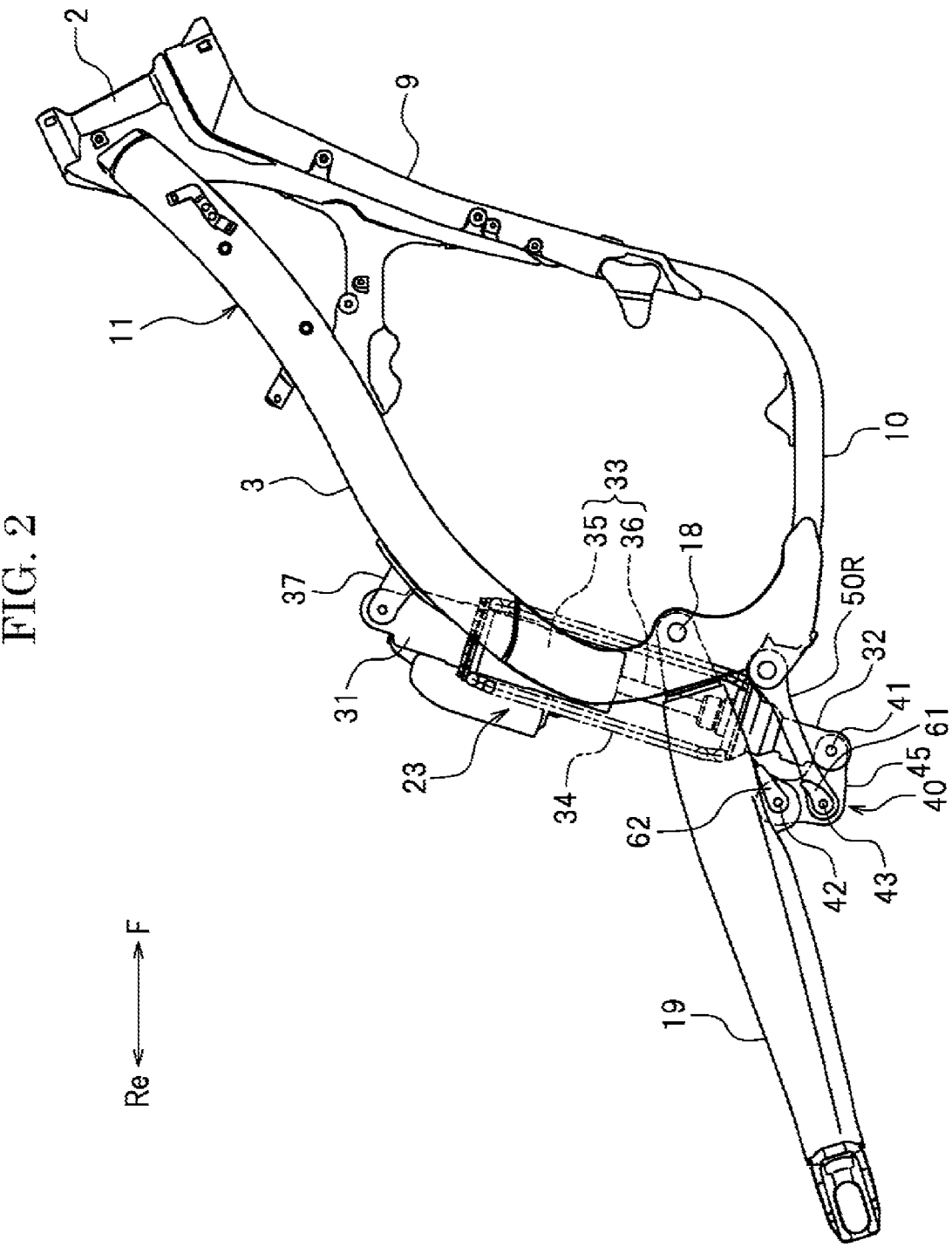
FIG. 2 is a right side view of a main frame, a rear arm, a rear suspension and a link mechanism in a state where the vehicle height is high.

The motorcycle 1 includes a rear suspension 23. FIG. 2 is a right side view of a portion of the vehicle frame 11, the rear suspension 23, the rear arm 19 and the like. As shown in FIG. 2, the rear suspension 23 is coupled to the rear arm 19 via a link mechanism 40. The link mechanism 40 is located below the rear suspension 23. The rear suspension 23 is a so-called bottom-link type rear suspension.

The rear suspension 23 includes a dumper 33 and a spring 34 located around the dumper 33. The dumper 33 includes a cylinder 35 and a rod 36 slidable with respect to the cylinder 35. The cylinder 35 may be any suitable cylinder for a vehicle such as, for example, an oil cylinder or a gas cylinder. The rear suspension 23 includes a first end portion 31 fixed to the cylinder 35 and a second end portion 32 fixed to the rod 36. A top end of the spring 34 is connected to the first end portion 31, and a bottom end of the spring 34 is connected to the second end portion 32. The dumper 33 and the spring 34 are located parallel to each other. The main frames 3 are each provided with a bracket 37. The first end portion 31 of the rear suspension 23 is rotatably connected to the brackets 37. The brackets 37 are portions of the vehicle main body. Therefore, the first end portion 31 of the rear suspension 23 is rotatably connected to the vehicle main body.

The link mechanism 40 includes a link member 45, and left and right coupling rods 50L and 50R (only the coupling rod 50R is shown in FIG. 2). The link member 45 is provided between the second end portion 32 of the rear suspension 23 and the rear arm 19. The coupling rods 50L and 50R are provided between the main frame 3 and the link member 45. The link member 45 and the coupling rods 50L and 50R are located below the rear arm 19.

Figure 3:
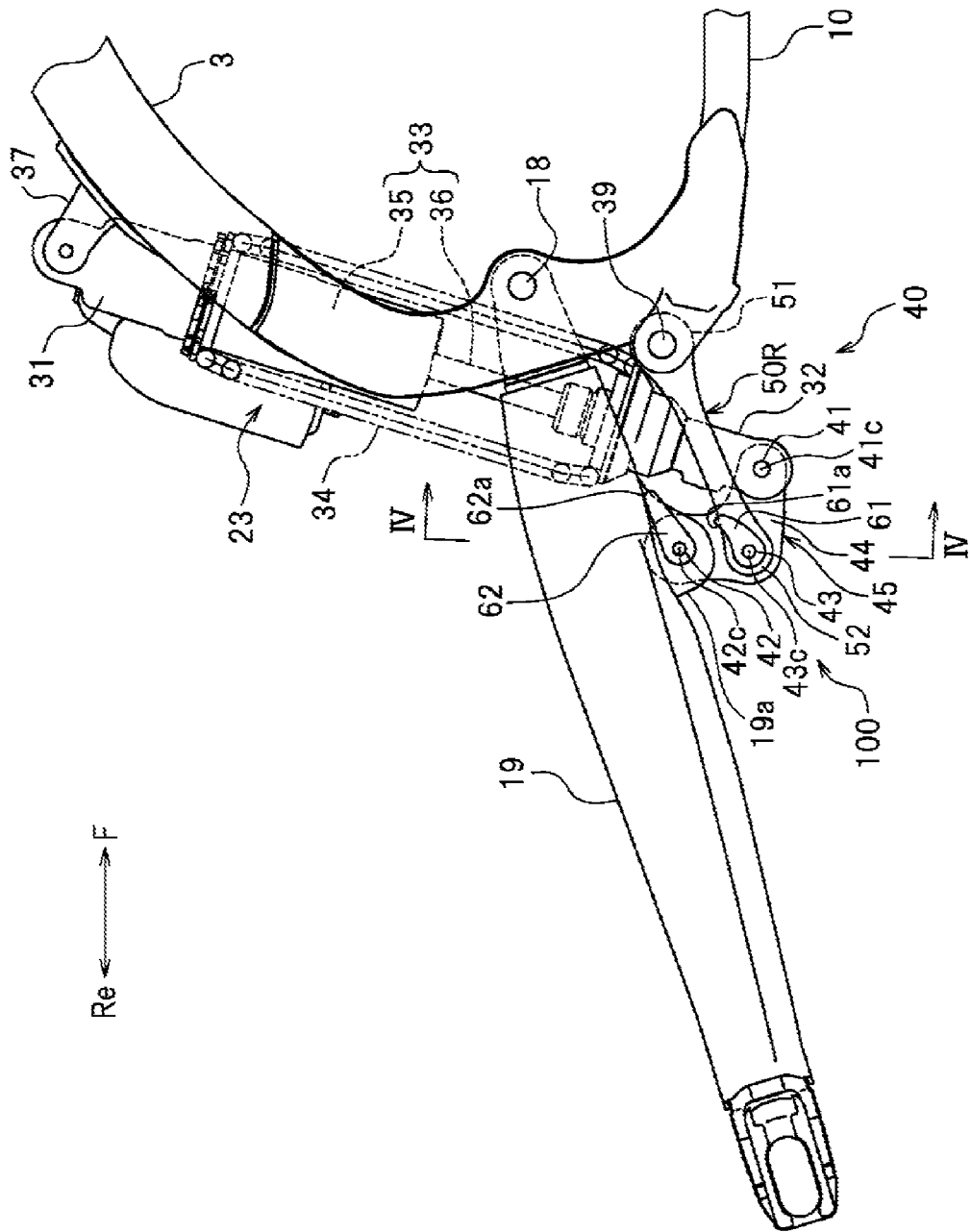
FIG. 3 is a partial enlarged view of FIG. 2.

FIG. 3 is a partial enlarged view of FIG. 2. As shown in FIG. 3, the link member 45 includes a boomerang-shaped link plate 44, and a first shaft 41, a second shaft 42 and a third shaft 43 which run through the link plate 44. The first shaft 41, the second shaft 42 and the third shaft 43 extend in the vehicle width direction. The "vehicle width direction" refers to the left-right direction. A center 41c of the first shaft 41 is located forward to a center 43c of the third shaft 43, and a center 42c of the second shaft 42 is located upward to the center 43c of the third shaft 43. The second end 32 of the rear suspension 23 is rotatably connected to the first shaft 41. The second shaft 42 is rotatably connected to brackets 19a of the rear arm 19.

Figure 4:
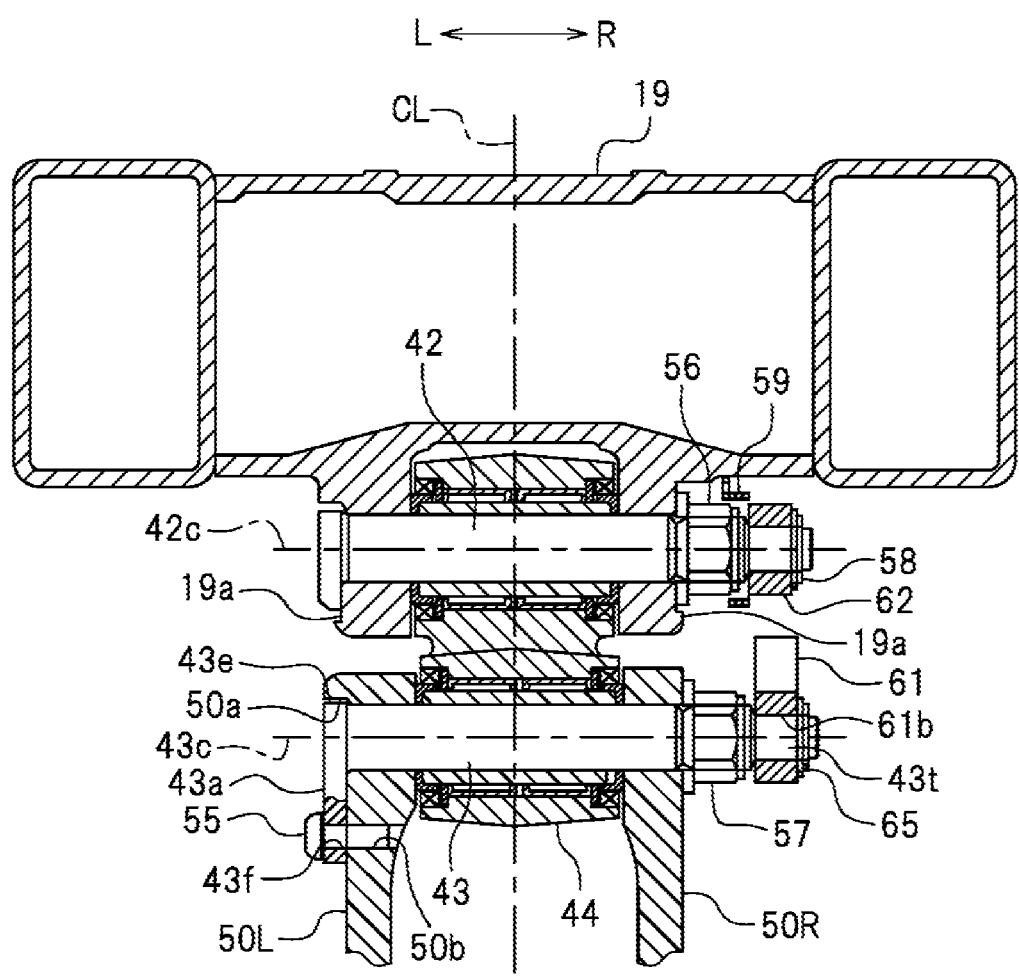
FIG. 4 is a cross-sectional view of FIG. 3 taken along line IV-IV.

The left and right coupling rods 50L and 50R each include a first end portion 51 rotatably connected to the corresponding main frame 3 and a second end portion 52 fixed to the third shaft 43 so as to rotate together with the third shaft 43. The first end portion 51 is rotatably connected to the main frame 3 via a shaft 39 extending in the vehicle width direction. As shown in FIG. 4, the right coupling rod 50R is located to the right of the link plate 44, and the left coupling rod 50L is located to the left of the link plate 44. In the figure, "CL" represents the center line of the vehicle.

The second shaft 42 is inserted into the brackets 19a of the rear arm 19 and the link plate 44 from left to right. The second shaft 42 is fixed to a right surface of the right bracket 19a by a nut 56. The third shaft 43 is inserted into the left coupling rod 50L, the link plate 44 and the right coupling rod 50R from left to right. The third shaft 43 is fixed to a right surface of the right coupling rod 50R by a nut 57.

Figure 5:
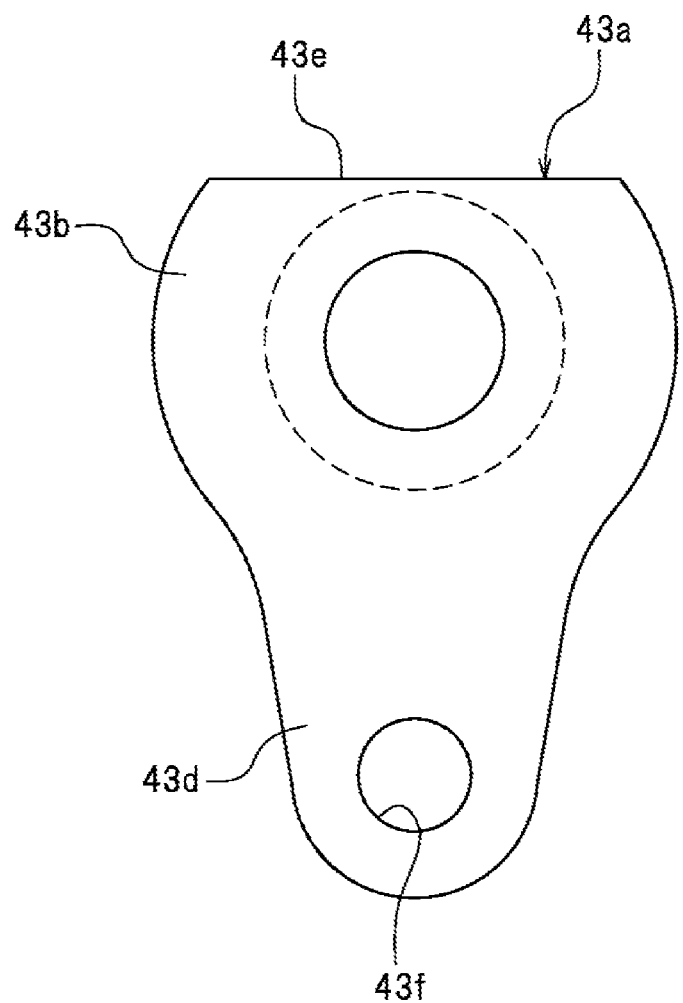
FIG. 5 is a front view of a rotation restriction portion.

The third shaft 43 includes a rotation restriction portion 43a, which is coupled to the coupling rod 50L and thus is restricted from rotating with respect to the coupling rod 50L. The rotation restriction portion 43a is located to the left of the left coupling rod 50L. As shown in FIG. 5, the rotation restriction portion 43a includes a large diameter portion 43b and a small diameter portion 43d. The large diameter portion 43b has a flat face 43e. As shown in FIG. 4, the left coupling rod 50L has a flat face 50a which is parallel to the flat face 43e of the rotation restriction portion 43a. The flat face 43e of the rotation restriction portion 43a and the flat face 50a of the coupling rod 50L are engaged with each other, and thus the rotation of the rotation restriction portion 43a with respect to the coupling rod 50L is restricted. In this embodiment, the flat face 43e and the flat face 50a are in plane contact with each other. Owing to this, the rotation of the third shaft 43 with respect to the coupling rods 50L and 50R is restricted.

The third shaft 43 and the coupling rod 50L are fixed to each other by a bolt 55. As shown in FIG. 5, the small diameter portion 43d of the rotation restriction portion 43 has a hole 43f. As shown in FIG. 4, the coupling rod 50L has a hole 50b. The bolt 55 is inserted into the hole 43f and the hole 50b. The rotation restriction portion 43a is fixed by the bolt 55 so as not to rotate with respect to the coupling rod 50L. The bolt 55 also restricts the rotation of the third shaft 43 with respect to the coupling rods 50L and 50R.

Figure 6:
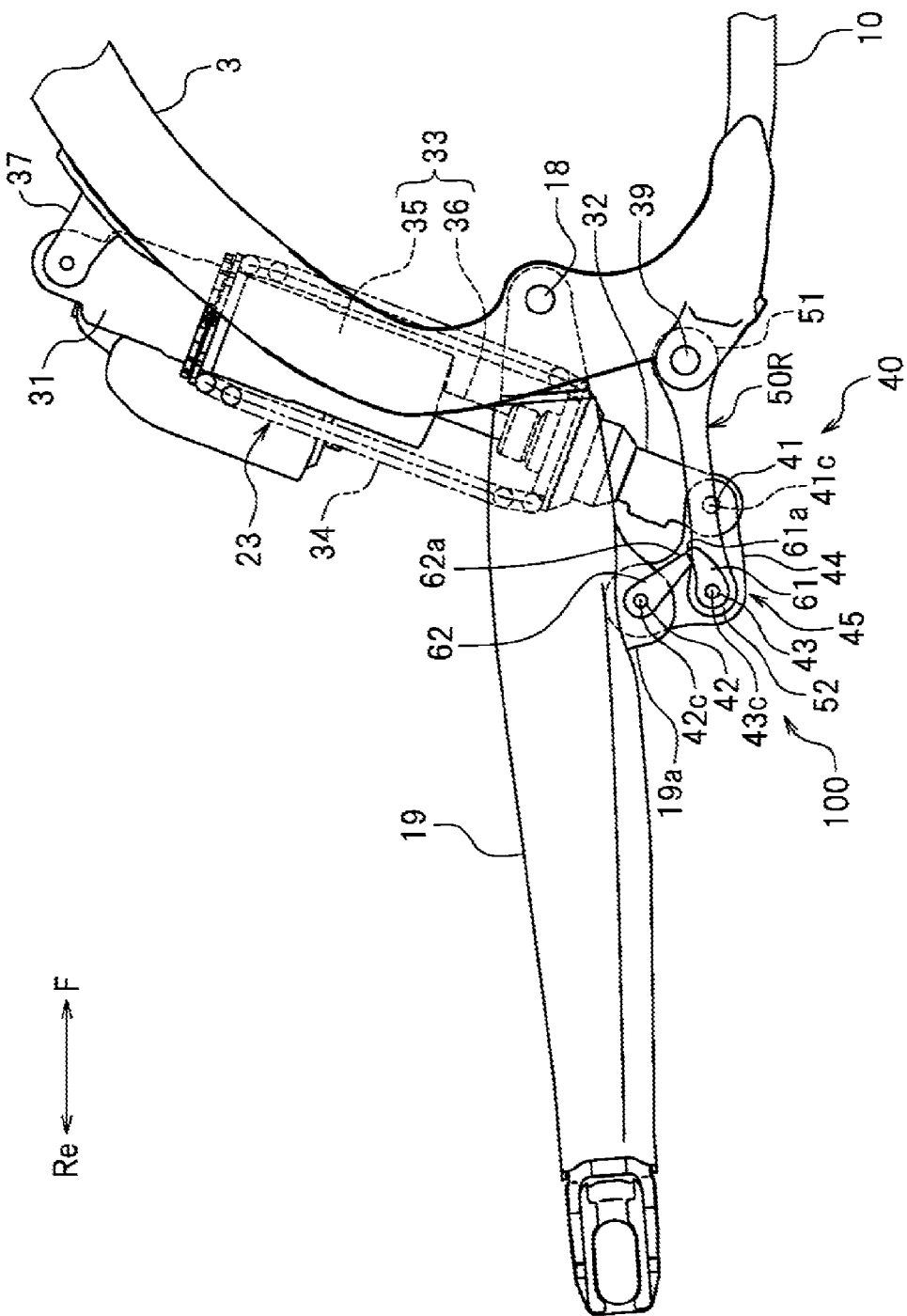
FIG. 6 corresponds to FIG. 3 and shows a state where the vehicle height is low, in which a first lever and a second lever are in engagement with each other.

As shown in FIG. 6, the motorcycle 1 includes a vehicle height lowering device 100 capable of fixing the rear arm 19 at such a position that the vehicle height is lower than a usual vehicle height. Now, a structure of the vehicle height lowering device 100 will be described.

The vehicle height lowering device 100 includes a first lever 61 and a second lever 62 engageable with each other. As shown in FIG. 6, when the first lever 61 and the second lever 62 are put into engagement with each other in a state where the spring 34 of the rear suspension 23 is compressed, the rear arm 19 is fixed at such a position that the vehicle height is lower than a usual vehicle height. While the first lever 61 and the second lever 62 are engaged with each other, the center 43c of the third shaft 43 is located rearward to the center 41c of the first shaft and forward to the center 42c of the second shaft 42. When the first lever 61 and the second lever 62 are released from the engaged state, the spring 34 of the rear suspension 23 is extended to release the rear arm 19 from the fixed state.

Figure 7:
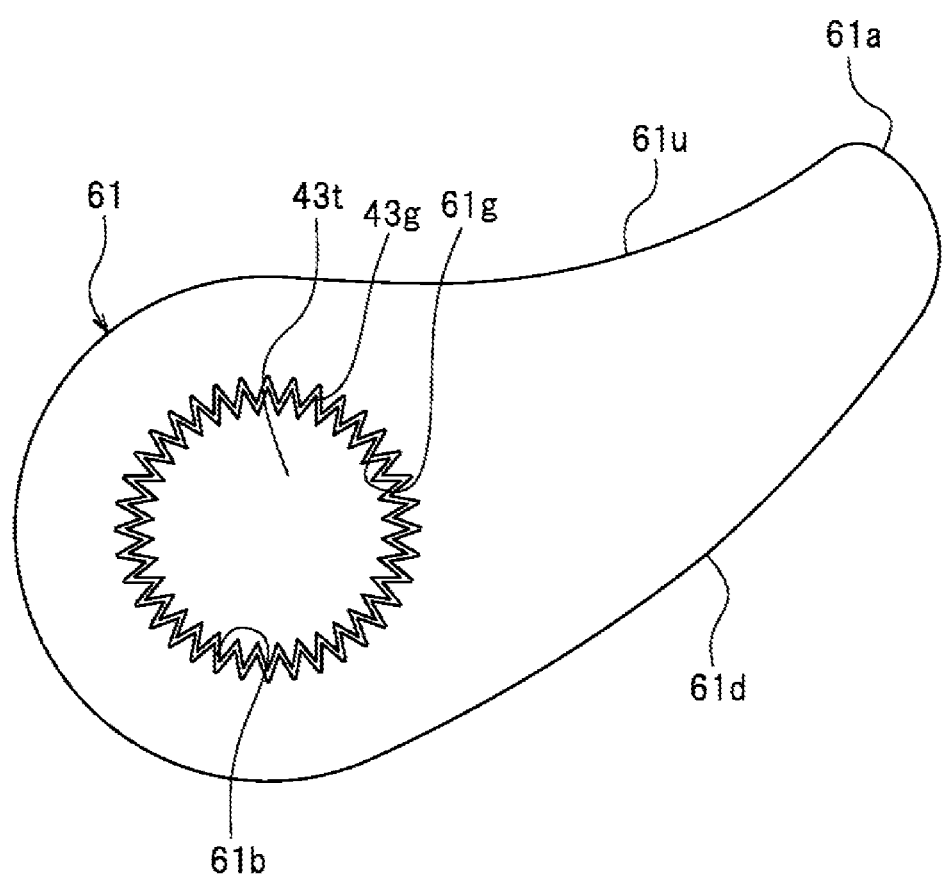
FIG. 7 is a view showing serration coupling of the first lever and a third shaft.

The first lever 61 is attached to the third shaft 43 so as to rotate together with the third shaft 43. As shown in FIG. 4, the first lever 61 is attached to a tip portion 43t of the third shaft 43 that is to the right of the nut 57. The tip portion 43t of the third shaft 43 forms an insertion portion which is inserted into a hole 61b of the first lever 61. As shown in FIG. 7, the tip portion 43t of the third shaft 43 has serrated teeth 43g. Around the hole 61b of the first lever 61, serrated grooves 61 are formed. The tip portion 43t of the third shaft 43 is inserted into the hole 61b of the first lever 61, and thus the serrated teeth 43g and the serrated grooves 61g are geared with each other. As a result, the first lever 61 is connected to the third shaft 43 so as not to be rotatable. In FIG. 7, a gap between the serrated teeth 43g and the serrated grooves 61g is shown in an emphasized manner. In this manner, the first lever 61 and the third shaft 43 are in serration coupling with each other, and thus the first lever 61 is rotatable together with the third shaft 43.

As shown in FIG. 4, a circlip 65 is buried in a portion of the third shaft 43 that is to the right of the first lever 61. The circlip 65 prevents the first lever 61 from coming off from the third shaft 43. As shown in FIG. 7, the first lever 61 is shaped to be narrower as being farther from the third shaft 43. Namely, the first lever 61 is shaped to be narrower as being farther from a base thereof and closer to a tip thereof. As seen in a side view of the vehicle, a bottom side 61d of the first lever 61 is curved in a convexed manner, and a top side 61u of the first lever 61 is curved in a concaved manner.

The second lever 62 is rotatably connected to the second shaft 42. As shown in FIG. 4, the second lever 62 is attached to a portion of the second shaft 42 that is to the right of the nut 56. A circlip 58 is buried in a portion of the second shaft 42 that is to the right of the second lever 62. The circlip 58 prevents the second lever 62 from coming off from the second shaft 42. As shown in FIG. 6, the second lever 62 is shaped to be narrower as being farther from the second shaft 42. Namely, the second lever 62 is shaped to be narrower from being farther from a base thereof and closer to a tip thereof. A tip portion 62a of the second lever 62 is curved in a convexed manner.

As shown in FIG. 4, a torsion spring 59 for providing a force for rotating the second lever 62 around the second shaft 42 is attached to the second lever 62. The torsion spring 59 is provided between the second lever 62 and the rear arm 19. Although not shown, one end of the torsion spring 59 is in engagement with the second lever 62, and the other end of the torsion spring 59 is in engagement with the rear arm 19. The torsion spring 59 provides the second lever 62 with a force that may move the tip portion 62a of the second lever 62 upward. The torsion spring 59 provides the second lever 62 with a counterclockwise force in FIG. 6.

Now, a method for fixing the rear arm 19 at such a position that the vehicle height is lowered will be described. First, in a state where the vehicle height is the usual height (the motorcycle 1 is in this state while running; see FIG. 1 and FIG. 3), the motorcycle 1 is pressed from above to lower the vehicle height. In this state, the spring 34 of the rear suspension 23 is compressed, and the rear arm 19 rotates clockwise in FIG. 3 as centered around the pivot shaft 18. The coupling shaft 50R rotates clockwise as centered around the shaft 39, and thus is moved from a state inclined with respect to the horizontal line (see FIG. 3) to a generally horizontal state (see FIG. 6). As the coupling rod 50R rotates, the third shaft 43 connected to the second end portion 52 of the coupling rod 50R rotates clockwise with respect to the link plate 44. The first lever 61, which rotates together with the third shaft 43, rotates clockwise. As a result, as shown in FIG. 6, the position of a tip portion 61a of the first lever 61 is lowered, and the tip portion 61a is moved to such a position as to be engageable with the tip portion 62a of the second lever 62 (hereinafter, this position will be referred to as the "engageable position").

When the vehicle height is further lowered from the state shown in FIG. 6, the tip portion 61a of the first lever 61 is further lowered to such a position as not to contact the tip portion 62a of the second lever 62 even when the second lever 62 is rotated clockwise around the second shaft 42. In this state, the second lever 62 is rotated clockwise to a position exceeding the engageable position. For this rotation of the second lever 62, a force stronger than an elastic force of the torsion spring 59 is needed. Thus, it may be suitable to use a tool or the like to rotate the second lever 62. An attaching portion to which the tool or the like can be attached may be formed in the second lever 62 in advance. The attaching portion may be a hole or the like into which the tool or the like can be inserted.

The second lever 62 is rotated to the position exceeding the engageable position and then the force for pressing the motorcycle 1 from above is weakened. In this manner, the rod 36 is extended by the force of the spring 34 of the rear suspension 23, and the link member 45 is pressed down. When this occurs, the third shaft 43 and the first lever 61 rotate counterclockwise with respect to the link plate 44, and the tip portion 61a of the first lever 61 is moved upward. As a result, the tip portion 61a of the first lever 61 and the tip portion 62a of the second lever 62 are engaged with each other at the engageable position. The link member 45 receives the force of the spring 34 of the rear suspension 23, and therefore, the first lever 61 is always supplied with a counterclockwise force. However, the rotation of the first lever 61 is restricted by the second lever 62. Therefore, the rotation of the rear arm 19 is restricted, and thus the position of the rear arm 19 is fixed in a state where the vehicle height is low as shown in FIG. 6. By fixing the position of the rear arm 19 in a state where the vehicle height is low, the motorcycle 1 can be held in a state where the vehicle height is low and thus the ground-sole contact of the rider when the rider is on the motorcycle can be improved.

Now, a method for releasing the rear arm 19 from the fixed position will be described. The second lever 62 is always supplied with an elastic force of the torsion spring 59. Therefore, once the tip portion 61a of the first lever 61 and the tip portion 62a of the second lever 62 are released from the engaged state, the second lever 62 rotates counterclockwise in FIG. 6 and is displaced from the engageable position. When, for example, the rear wheel 21 of the motorcycle 1 is to go over a step, the rear wheel 21 is moved upward once and the rear arm 19 rotates clockwise in FIG. 6 as centered around the pivot shaft 18. As a result, the coupling rod 50R rotates clockwise as centered around the shaft 39, and the first lever 61 rotates clockwise as centered around the third shaft 43. When this occurs, the tip portion 61a of the first lever 61 is moved downward, and thus the tip portion 61a of the first lever 61 and the tip portion 62a of the second lever 62 are released from the engaged state. The second lever 62 is rotated counterclockwise as centered around the second shaft 42 by the elastic force of the torsion spring 59. Therefore, the tip portion 62a of the second lever 62 is moved to a position displaced from the engageable position. In this embodiment, the tip portion 62a is moved to such a position as to contact a bottom surface of the rear arm 19. Once the tip portion 62a of the second lever 62 is displaced from the engaged position, even when the rear wheel 21 goes over the step and the tip portion 61a of the first lever 61 returns to the engageable position, the first lever 61 and the second lever 62 are not engaged with each other anymore. Therefore, the link member 45 is pressed down by the force of the spring 34 of the rear suspension 23, and the rear arm 19 is pulled down by the link member 45. As a result, the rear arm 19 rotates counterclockwise as centered around the pivot shaft 18 and moves back to the usual position. In this manner, the position of the rear arm 19 can be easily released from the fixed position and thus the vehicle height of the motorcycle 1 can be raised, while the motorcycle 1 is running.

As described above, according to the motorcycle 1 in this embodiment, the position of rear arm 19 can be fixed in a state where the vehicle height is relatively low by engaging the second lever 61 with the first lever 61 at such a position that the vehicle height is low. The motorcycle 1 can be held in a state where the vehicle height is relatively low, and thus the ground-sole contact of the rider when the rider is on the motorcycle can be improved. The second lever 62 receives, from the torsion spring 59, a force for rotating the second lever 62 around the second shaft 42. Therefore, once the first lever 61 and the second lever 62 are released from the engaged state, for example, by running the motorcycle 1 so as to go over a step, the second lever 62 rotates. After this, the first lever 61 and the second lever 62 are not engaged with each other. Accordingly, in this embodiment, the rear arm 19 can be released from the fixed position in a satisfactory manner. The motorcycle 1 can be released from the state where the vehicle height is low in a satisfactory manner.

As shown in FIG. 7, the serrated grooves 61g are formed around the hole 61b of the first lever 61, and the tip portion 43t of the third shaft 43 has the serrated teeth 43g. By inserting the tip portion 43t of the third shaft 43 into the hole 61b of the first lever 61, the first lever 61 can be easily attached to the third shaft 43. Since the position at which the serrated teeth 43g are geared with the serrated grooves 61g can be selectively changed, the number of attaching angles of the first lever 61 to the third shaft 43 is the same as the number of the serrated teeth 43g. For example, in the case where the number of the serrated teeth 43g is 72, the attaching angle of the first lever 61 may be set every 5 degrees (360°/72=5°). By adjusting the attaching angle of the first lever 61, the engageable position of the first lever 61 and the second lever 62 can be selectively set. Therefore, in this embodiment, the vehicle height when the position of the rear arm 19 is fixed can be selectively set. In this embodiment, the vehicle height at which the motorcycle 1 can be held can be selectively set.

In this embodiment, the power transmission mechanism for coupling the output shaft 29a of the engine 29 and the rear wheel 21, namely, the sprockets 29b and 20b and the chain 70, are located to the left of the center line CL of the vehicle. The first lever 61 and the second lever 62 are located to the right of the center line CL of the vehicle. Therefore, it is unlikely that the first lever 61 and the second lever 62 disturb the sprockets 29b and 20b and the chain 70. The interference of the first lever 61 and the second lever 62 with the sprockets 29b and 20b and the chain 70 can be avoided easily.

As shown in FIG. 4 and FIG. 5, the third shaft 43 includes the rotation restriction portion 43a, which is coupled to the coupling rod 50L and thus is restricted from rotating with respect to the coupling rod 50L. The third shaft 43 is supplied by the spring 34 of the rear suspension 23 with a strong force in a direction for rotating the third shaft 43 with respect to the coupling force 50L. However, because the third shaft 43 includes the rotation restriction portion 43a, the rotation of the third shaft 43 with respect to the coupling force 50L can be sufficiently restricted.

The rotation restriction portion 43a has the flat face 43e, which is plane-contactable with the flat face 50a of the coupling rod 50L. Even when the third shaft 43 is supplied with a strong force in a direction for rotating the third shaft 43 with respect to the coupling rod 50L, the rotation of the third shaft 43 and the coupling rod 50L with respect to each other can be sufficiently restricted. The strength of the rotation restriction portion 43a can be improved, so that the third shaft 43 and the coupling rod 50L are substantially prevented from being broken.

In addition, the rotation restriction portion 43a and the coupling rod 50L are fixed to each other by the bolt 55. Therefore, the rotation of the third shaft 43 and the coupling rod 50L with respect to each other can be substantially restricted. Moreover, the third shaft 43 and the coupling rod 50L are substantially prevented from being broken.

The first lever 61 is shaped to be narrower as being farther from the third shaft 43. The second lever 62 is shaped to be narrower as being farther from the second shaft 42. Owing to this, the engagement of the first lever 61 and the second lever 62 and the release thereof from the engaged state can be performed easily, and the fixing of the position of the rear arm 19 and the release thereof from the fixed position can be performed easily.

So far, an embodiment of the present invention has been described. The above-described embodiment is merely an example, and the present invention may be carried out in any of various embodiments.

In the above-described embodiment, the second spring for providing a force for rotating the second lever 62 around the second shaft 42 is the torsion spring 59. It is contemplated that the second spring may be any spring suitable for providing a force for rotating the second lever 62.

In the above-described embodiment, the power transmission mechanism for transmitting the output of the engine 29 to the rear wheel 21 (namely, the sprockets 29a and 20b and the chain 70) is located to the left of the center line CL of the vehicle, whereas the first lever 61 and the second lever 62 are located to the right of the center line CL of the vehicle. These elements may be located in an opposite manner. Namely, the power transmission mechanism may be located to the right of the center line CL of the vehicle, whereas the first lever 61 and the second lever 62 may be located to the left of the center line CL of the vehicle. It is also possible to locate all the first lever 61, the second lever 62 and the power transmission mechanism to the left or to the right of the center line CL of the vehicle, in such a manner that the first lever 61 and the second lever 62 do not interfere with the power transmission mechanism.

In the above-described embodiment, the first lever 61 is attached to a right end portion of the third shaft 43, the second lever 62 is attached to a right end portion of the second shaft 42, and the rotation restriction portion 43a is attached to a left end portion of the third shaft 43. These elements may be located in an opposite manner. Namely, the first lever 61 may be attached to the left end portion of the third shaft 43, the second lever 62 may be attached to a left end portion of the second shaft 42, and the rotation restriction portion 43a may be attached to the right end portion of the third shaft 43.

In the above-described embodiment, the tip portion 43t of the third shaft 43 is inserted into the hole 61b of the first lever 61, and thus the first lever 61 is attached to the third shaft 43. First lever 61 may be attached to the third shaft 43 in any suitable manner. For example, the first lever 61 may have a shaft protruding leftward and the third shaft 43 may have a hole at the right end portion, and the shaft may be inserted into the hole, so that the first lever can be attached to the third shaft 43. In this case, the shaft may have spline teeth and the hole may have spline groove, so that the attaching angle of the first lever 61 is adjustable. The second lever 62 may be attached to the second shaft 42 in any suitable manner.

The shape of the first lever 61 and the second lever 62 is not limited to that described above. The first lever 61 and the second lever 62 may have any other shape with which the engagement thereof and the release thereof from the engaged state can be performed in a satisfactory manner.

The first lever 61 and the second lever 62 may be formed from any suitable material. The first lever 61 and the second lever 62 may be formed of a material harder than the material of the link plate 44 or the coupling rods 50L and 50R in order to have an improved strength.

The invention claimed is:
1. A motorcycle, comprising:
 a vehicle main body;
 a rear arm that supports a rear wheel;
 a pivot shaft that rotatably connects the rear arm to the vehicle main body, the pivot shaft extending in a vehicle width direction;
 a rear suspension including a first end portion rotatably supported by the vehicle main body, a second end por- tion, and a first spring disposed between the first end portion and the second end portion;

a link member including a first shaft, a second shaft and a third shaft, the first shaft, the second shaft and the third shaft each extending in the vehicle width direction, the link member being rotatably connected to the second end portion of the rear suspension via the first shaft and rotatably connected to the rear arm via the second shaft;

a coupling rod including a first end portion rotatably connected to the vehicle main body and a second end portion connected to the third shaft so as to rotate together with the third shaft;

a first lever connected to the third shaft so as to rotate together with the third shaft;

a second lever rotatably connected to the second shaft, the second lever restricting the rotation of the first lever when engaged with the first lever; and a second spring attached to the second lever.

2. A motorcycle according to claim 1, wherein:
the first shaft is located forward of the third shaft; and
the second shaft is located above the third shaft.

3. A motorcycle according to claim 1, wherein:
the first lever includes a hole, serrated grooves being formed around the hole; and
the third shaft includes an insertion portion including serrated teeth that are geared with the serrated grooves, the insertion portion being inserted into the hole.

4. A motorcycle according to claim 1, further comprising:
an engine including an output shaft; and
a power transmission mechanism that couples the output shaft and the rear wheel to each other;
wherein the power transmission mechanism is located at either one of a position to the left of a vehicle center line and a position to the right of the vehicle center line, and the first lever and the second lever are located at the other of the position to the left of the vehicle center line and the position to the right of the vehicle center line.

5. A motorcycle according to claim 1, wherein:
the first lever is attached to one of a right end portion and a left end portion of the third shaft; and
a rotation restriction portion that restricts the third shaft from being rotated with respect to the coupling rod when engaged with the coupling rod is provided at the other of the right end portion and the left end portion of the third shaft.

6. A motorcycle according to claim 1, further comprising a bolt that fixes the third shaft to the coupling rod.

7. A motorcycle according to claim 1, wherein a width of the second lever narrows in a direction moving away from the second shaft.

8. A motorcycle according to claim 1, wherein a width of the first lever narrows in a direction moving away from the third shaft.

9. A motorcycle according to claim 1, wherein the third shaft is located such that when the first lever and the second lever are engaged with each other, a center of the third shaft is located rearward of a center of the first shaft and forward of a center of the second shaft.

10. A motorcycle, comprising:
a vehicle main body;
a rear arm that supports a rear wheel;
a pivot shaft that rotatably connects the rear arm to the vehicle main body, the pivot shaft extending in a vehicle width direction;
a rear suspension including a first end portion rotatably supported by the vehicle main body, a second end portion, and a first spring disposed between the first end portion and the second end portion;
a link member including a first shaft, a second shaft and a third shaft, the first shaft, the second shaft and the third shaft each extending in the vehicle width direction, the link member being rotatably connected to the second end portion of the rear suspension via the first shaft and rotatably connected to the rear arm via the second shaft;
a coupling rod including a first end portion rotatably connected to the vehicle main body and a second end portion connected to the third shaft so as to rotate together with the third shaft;
a first lever connected to the third shaft so as to rotate together with the third shaft;
a second lever rotatably connected to the second shaft, the second lever restricting the rotation of the first lever when engaged with the first lever; and
a second spring attached to the second lever, the second spring providing a force for rotating the second lever around the second shaft.

11. A motorcycle according to claim 10, wherein:
the first shaft is located forward of the third shaft; and
the second shaft is located above the third shaft.

12. A motorcycle according to claim 10, wherein:
the first lever includes a hole, serrated grooves being formed around the hole; and
the third shaft includes an insertion portion including serrated teeth that are geared with the serrated grooves, the insertion portion being inserted into the hole.

* * * * *